Jan. 23, 1968 R. W. NICOLAUS 3,365,219
PRESSURE FITTING FOR A TUBE JOINT
Filed May 25, 1967 2 Sheets-Sheet 1

INVENTOR.
RONALD W. NICOLAUS
BY
ATT'Y

Jan. 23, 1968  R. W. NICOLAUS  3,365,219
PRESSURE FITTING FOR A TUBE JOINT

Filed May 25, 1967  2 Sheets-Sheet 2

INVENTOR.
RONALD W. NICOLAUS
BY
ATT'Y 3,365,219
PRESSURE FITTING FOR A TUBE JOINT
Ronald W. Nicolaus, Rockford, Ill., assignor to Eclipse Fuel Engineering Co., Rockford, Ill., a corporation of Illinois
Filed May 25, 1967, Ser. No. 641,333
3 Claims. (Cl. 285—340)

ABSTRACT OF THE DISCLOSURE

A pressure fitting for a tube joint embodying a Belleville-type spring washer which is compressed between a nut and a fitting body in such a manner that its inner periphery penetrates the metal of the tube to prevent tube pull-out. When the nut is fully tightened in the fitting body, an elastomeric gasket is compressed and establishes an annular seal between the tube and fitting body, while at the same time a solid column of metal is established by certain components within the fitting body and limits the extent to which the nut may be tightened within the body.

---

The improved pressure fitting comprising the present invention is designed for use primarily in connection with a commercial gas supply line wherein a length of flexible tubing is employed as a lead-in connection from a ground-embedded gas main to a distribution pipe within a building, the present fitting being useable at either end of the tubing for connecting the latter to the gas main or to the distribution pipe. The invention is, however, not limited to only such use and a pressure fitting embodying the principles of the present invention may, if desired and with or without modification as required, be employed as a tube-to-pipe fitting in a wide variety of hydraulic or pneumatic installations, regardless of whether such installations are high or low pressure ones.

A pressure fitting of the general type to which the present invention pertains is predicated upon a connection which extends between the flexible tubing or, in some instances, a pipe and the particular adjacent fitting component to which the tubing or pipe is connected, and requires neither threading of the tubing or pipe nor flaring the end thereof. Such a fitting is advantageous in that neither threading nor flaring operations are required in the field, the only requisite being that the tubing be cut to approximate length at the time of installation of the fitting. The absence of either a flared or a threaded tubing end ordinarily subjects a tube joint or connection to a low tension or "pull-out" factor so that other means is required for preventing tube pull-out with respect to the fitting. One such means which is frequently employed in connection with many different kinds of pressure fittings is the use of a frusto-conical locking ring of the type which is generally referred to as a "Belleville" spring. Such a locking ring, when flattened to planar configuration or posture, suffers a slight decrease of its internal diameter, and thus, when such a ring is caused closely to surround a tube, it will, upon being flattened, bite into the metal of the tube which it surrounds so that it may then offer the necessary reaction force against tube pull-out. It is to this class of pressure fittings that the present invention specifically pertains.

With many of the pressure fittings which employ Belleville-type locking rings, there is no assurance that the fitting not be either undertightened or overtightened during application or installation thereof. Undertightening will, of course, result in a leaky seal while overtightening may rupture or otherwise destroy the effectiveness of the frusto-conical locking ring. The present invention overcomes this difficulty and affords a pressure fitting which establishes for the threaded parts of the fitting, that is, the body and the nut, a home position beyond which there can be no further relative turning movement between the body and nut regardless of the degree of torque or turning movement that may be applied. Arrival of the parts at the home position may be ascertained by the sense of feel on the part of the operator so that undertightening of the fitting will be unlikely. The provision of a pressure fitting of the character briefly outlined above constitutes the principal object of the present invention.

Briefly, in carrying out the above-mentioned object, the invention contemplates the provision of the usual socketed fitting body and nut combination which is employed in connection with pressure fittings of the same general type, together with annular internal components all of which encircle the tubing within the cavity that is defined by the body and nut of the filling. These internal components include a Belleville-type locking ring, a deformable sealing ring which is adapted to be compressed so as to exert a sealing function against the tubing and the fitting body, and a rigid thrust ring or washer for compressing the sealing ring under the sliding influence or flattening of the locking ring. The sealing ring is disposed in a recess which is formed in the bottom wall of the socket in the fitting body while the locking ring is retained in a recess which is in the inner end face of the nut. The thrust ring is disposed between the locking ring and the sealing ring. When the fitting is fully tightened by turning the nut to the fullest extent with respect to the body of the fitting, the inner end face of the nut bears directly against the adjacent end face of the thrust washer while the other end face of the thrust washer bears directly against the bottom wall of the aforementioned socket in the fitting body. Thus, a solid column of metal is established so that no further relative axial movement of the fitting parts can be effected, regardless of the amount of torque which may be applied to the nut. In this fully tightened position of the various parts of the improved pressure fitting, the closed void which is established by the circular recess in the inner end face of the nut completely contains the locking ring which now assumes its flattened condition, while the closed void which is established by the annular recess at the bottom of the socket in the fitting body completely contains the sealing ring under compression.

An advantageous feature of the present invention resides in the provision of novel means for facilitating assembly or installation of the fitting in the field. In connection with similar fittings employing deformable sealing rings within the recessed fitting bodies, it has been customary to install such rings within the bodies and then, when a given installation is to be made in the field, the operator may simply insert or "stab" the tubing into the fitting body and tighten the nut. With the conventional fittings, when the operator is not careful in performing the stabbing operation, or when mastic or other foreign residue remains on the tubing, cutting of the sealing ring or other damage thereto may result, thus providing in a faulty seal after the fitting has been tightened. The present invention overcomes this limitation in that means are provided whereby the sealing ring is shielded from contact with the tubing during the initial insertion of the latter into the fitting.

Another advantageous feature of the present invention resides in the provision of means for maintaining the sealing ring and the thrust washer in their approximate positions within the fitting body once they have been installed therein so that in the event removal of the nut in the field becomes necessary, these parts remain captured within the fitting body.

Other objects and advantages of the invention, not at this time enumerated, will readily suggest themselves as the nature of the invention is better understood from a consideration of the following detailed description.

In the accompanying two sheets of drawings forming a part of this specification, one illustrative embodiment of the invention is shown.

Figure 1:
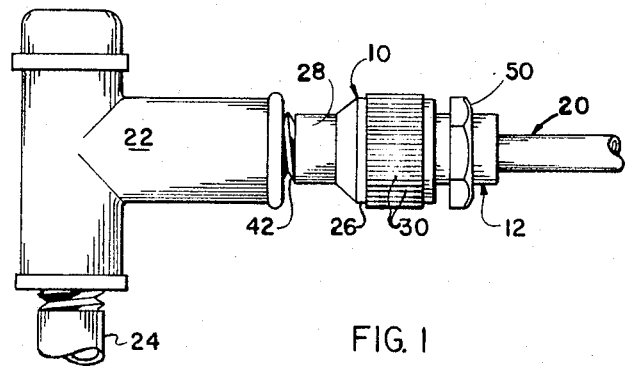
FIG. 1 is a fragmentary side elevational view of a tube-to-pipe pressure fitting embodying the principles of the present invention, the fitting being shown as operatively applied to a pipe section and a tube section.

Referring now to the drawings in detail, the tube-to-pipe fitting of the present invention comprises the usual two principal external parts or components, namely, a fitting body 10 and a cooperating nut 12. The fitting further comprises three internal components, namely, a locking ring 14, an elastomeric O-type sealing ring 16, and a two-part thrust washer and O-ring assembly 18. The two principal external parts and their internal components, when loosely assembled upon one another, constitute a package-type fitting in the form of a socket assembly into one end of which the unthreaded and unflared end of a flexible tube section 20 is adapted to be projected by a so-called stabbing operation as will be described presently.

The fitting body 10 is preferably, but not necessarily, in the form of a casting. It is desired for attachment to a pipe or a pipe fitting, such, for example, as the T fitting 22 which may be associated with a gas distribution pipe 24 and to which gas is supplied from a remote gas main (not shown) through the tube section 20. When the fitting is so attached and the tube section 20 is projected or inserted into the fitting and the fitting parts tightened, there is established a sealed leak-proof connection which will not pull apart under ordinary conditions of usage.

Figure 2:
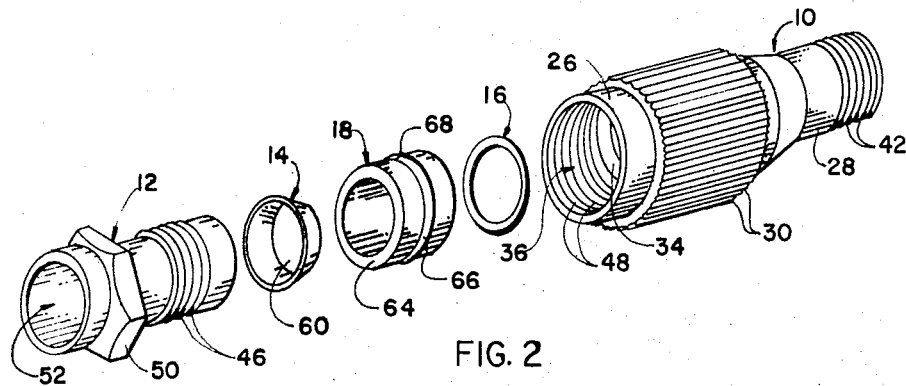
FIG. 2 is an exploded perspective view of the improved pressure fitting.
Figure 5:
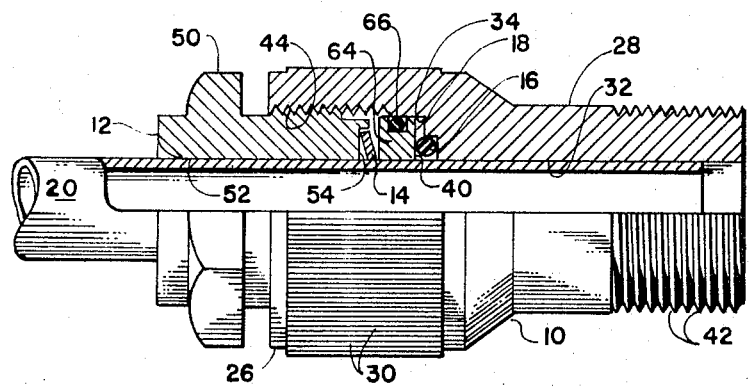
FIG. 5 is a view, partly in section and partly in side elevation, taken longitudinally through the fitting of FIG. 1.

As best illustrated in FIGS. 2 and 5, the fitting body 10 is in the form of an elongated, generally cylindrical sleeve having an enlarged socket portion 26 at one end thereof and a reduced shank portion 28 at its other end. The outer surface of the socket portion 26 may be knurled or ribbed as indicated at 30 or it may be made hexagonal or octagonal in order readily to receive a wrench or similar turning tool. An axial bore 32 extends through the shank portion 28 and communicates at its inner end with an enlarged counterbore 34 in the socket portion 26. The counterbore 34 establishes within the fitting body a relatively deep socket 36 (see FIG. 2) which presents an annular radially extending bottom wall 38. The latter has formed therein an annular recess 40 which is in immediately surrounding relation with the bore 32 and into which recess the bore opens. The reduced shank portion 28 of the body 10 is threaded exteriorly as at 42 for threaded reception in the T fitting 22 or other element such as a pipe section, an elbow, a shut-off cock or other similar structure, while the counterbore 34 is provided with a female screw thread 44 for threaded reception of the usual male screw thread 46 on the nut 12.

Figure 6:
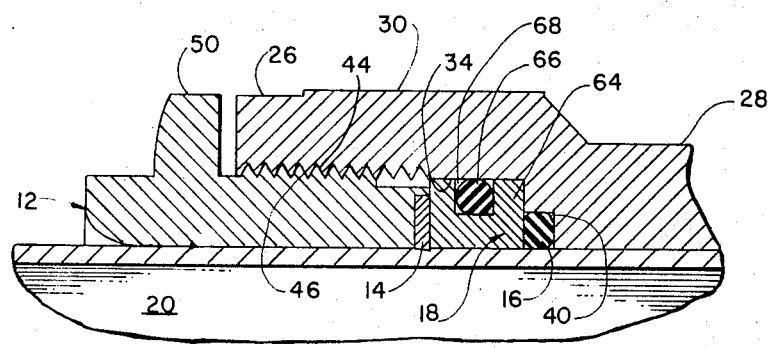
FIG. 6 is a fragmentary quarter section showing the fitting parts tightened upon a section of a tube.

The nut 12 is, like the fitting body 10, generally of cylindrical design and has said male screw thread 46 for reception by a female screw thread 48 which forms the outer one-half part of the bore 32 in the fitting body 10. An outwardly extending flange 50 of hexagonal configuration is formed on the central portion of the nut in order to permit the latter to be gripped by a wrench or other turning tool in connection with tightening or loosening of the nut with respect to the fitting body 10. An axial bore 52 extends longitudinally through the nut 12 and is of the same diameter as that of the bore 32. The outer end of said bore is preferably outwardly flared as shown in FIGS. 5 and 6 in order to facilitate insertion of the tube section 20 through the nut 12. The inner end face 54 of the nut 12 is formed with a forwardly extending, integral, annular rib 56 (see FIG. 7) which is formed integrally with the peripheral portion of the inner end of the nut 12 and defines a forwardly facing circular recess 58 for reception therein of the locking ring 14 in a manner and for a purpose that will be made clear presently. As shown in FIGS. 5, 6, 7 and 8, the inner end of the male screw thread 46 terminates adjacent to the base region of the annular rib 56 with the result that the outer periphery of said rib is smooth and spaced from the adjacent portion of the female screw thread 44 when the nut and fitting body are in assembled relation.

Figures 3, 4:
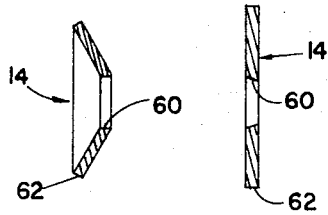
FIG. 3 is a sectional view taken centrally and axially through the locking ring of the fitting and showing the same in its free or unflattened state.
FIG. 4 is a sectional view similar to FIG. 3, but showing the locking ring in its flattened condition.
Figure 7:
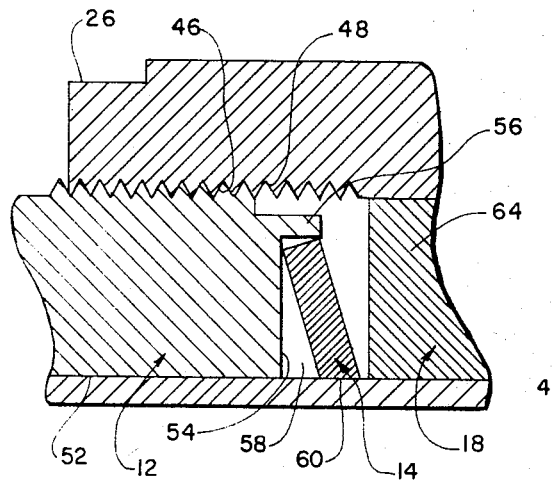
FIG. 7 is an enlarged fragmentary sectional view of a portion of the structure shown in FIG. 5.

The locking ring 14 is formed of spring steel and in its free state it is of frusto-conical design as best illustrated in FIGS. 2 and 7 of the drawings and flares in the direction of the nut 12. The slant angle of the locking ring 14 is on the order of 60° with respect to the axis of the tube section 20 when the locking ring is not under compression. The inner diameter of the locking ring is a few thousandths of an inch greater than the outer diameter of the tube section 20 when the ring is in its free state and as the result of not being compressed. As shown in FIGS. 5 and 6 of the drawings, the over-all diameter of the locking ring is substantially equal to the inner diameter of the forwardly extending rib 56 on the peripheral portion of the inner end face of the nut 12 so that the locking ring may be nested within the recess 58 when the fitting parts are assembled loosely upon one another as shown in FIGS. 4 and 7. The thickness of the metal of the locking ring 14 is substantially equal to the depth of the circular recess 58. A central circular opening 60 in the locking ring forms a truly cylindrical inner ring periphery or rim when the ring is not flattened or compressed and the outer periphery or rim 62 of the ring is normally frusto-conical so that its surface is normal to the opposite side faces of said locking ring 14. When the fitting parts are loosely assembled preparatory to tightening the same upon the tube section 20, the locking ring 14 assumes the position in which it is shown in FIGS. 5 and 7 with a major portion thereof disposed within the recess 58 and with the remaining portion projecting forwardly and out of said recess.

The thrust washer and O-ring assembly 18 consists of a thrust washer 64 and an associated elastomeric O-ring 66, the latter being disposed within an annular recess 68 in the medial region of the outer periphery of the washer. Except for the provision of the recess 68, the thrust washer 64 is rectangular in radial cross section and is of appreciable longitudinal thickness. The outer periphery of the O-ring 66 is slightly greater than the diameter of the counterbore 34 in order that said O-ring serves frictionally to hold the assembly 18 in place in the counterbore. The internal diameter of the thrust washer is the same as the diameters of the bores 32 and 52.

The previously mentioned recess 40 in the bottom wall of the socket 32 receives the O-ring 16 therein and this O-ring, in its free uncompressed state, has a major portion thereof disposed within the recess 40 as shown in FIG. 5. The internal diameter of the O-ring 16 is slightly greater than the external diameter of the tube section 20 which it surrounds, and is also greater than the internal diameter of the thrust washer 64 for a purpose that will be made clear hereafter.

By partially assembling the tube-to-pipe fitting of the present invention, the same may be marketed as a package unit ready for immediate installation in the field by the simple expedient of inserting an end of the flexible tube section 20 into the bore 32 (see FIG. 5) in the fitting body 10, the insertion being made through the bore 52 in the nut 12. The partial assembly is initially made at the factory by the manufacturer by first inserting the elastomeric O-ring 16 into the socket 32 and causing the same to become nested within the annular recess 40 (see FIG. 5), where it is frictionally held in position by reason of the fact that the outer diameter of the O-ring is slightly greater than the diameter of the recess 40. Thereafter, the thrust washer and O-ring assembly 18 is inserted in the counterbore 34 so that the O-ring 66 makes frictional contact with the internal wall of the bore 34, thus retaining this assembly in position. The frusto-conical locking ring 14 is then inserted in the recess 58 in the inner end face of the nut 12 and said nut, together with the thus installed locking ring 14, is then loosely threaded into the socket portion 26 of the fitting body 10. The threading operation is continued only until such time as the nut is finger-tight within the counterbore 34 so that the various internal parts including the locking ring, the thrust washer 64 and the O-ring 16 are in contiguity but not under compression. After the end region of the tube section 20 has thus been inserted through the axial bore 52 in the nut 12 and into the axial bore 32 in the shank portion 28 of the fitting body 10 as previously indicated, the operator need only tighten the nut 12 fully within the counterbore 34 in order to complete the union or joint between the tube section 20 and the T fitting 22.

Figure 8:
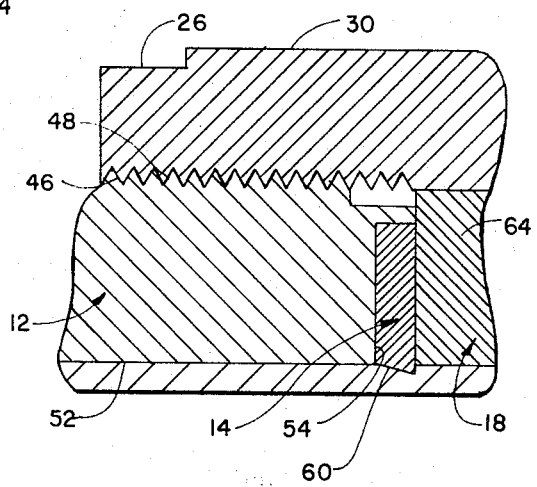
FIG. 8 is a sectional view similar to FIG. 7 but showing the fitting parts in their tightened state or condition.

Upon initial tightening the nut 12, the frusto-conical locking ring 14 is forced forwardly in the direction of the fitting body 10 until the small base thereof engages the adjacent end face of the thrust washer 64 and carries said thrust washer forwardly and into engagement with the O-type sealing ring 16. Continued tightening of the nut 12 forces the thrust washer 64 against the sealing ring 16 and compresses the latter against the bottom wall of the annular recess 40, this compression continuing until such time as the other end face of the thrust washer 64 moves into direct contact or abutment with the bottom wall 38 of the socket 36 in the fitting body 10, at which time the sealing ring is disposed substantially entirely within the confines of the recess 40 and its inner periphery is compressed tightly against the adjacent portion of the tube portion 20 in order to form an effective or efficient seal between the fitting and said tube section. Thereafter, the pressure that is exerted by continued tightening of the nut 12 is applied to the locking ring 14 so that the latter becomes progressively flattened. This flattening of the locking ring continues until such time as the forward end face of the annular rib 56 on the inner end of the nut 12 engages the adjacent end face of the thrust washer 64 as shown in FIGS. 6 and 8. At this time, the normally frusto-conical locking ring 14 assumes a flat condition so that the originally frusto-conical outer rim 62 thereof attains a cylindrical configuration in complete and full abutment with the inner periphery of the annular rib 56, while the originally cylindrical inner rim 60 attains a frusto-conical configuration. Since the outer rim 62 of the frusto-conical locking ring 14 is confined by the forwardly projecting rib 56 on the inner end of the nut 12, and since the slant height of the ring is greater than the inner diameter of this rib, such straightening out or flattening of the locking ring 14 causes the forward inner edge of the locking ring forcibly to dig into the metal of the tube section 20 as clearly shown in FIG. 8, while at the same time the ring 14 becomes wholly confined within the circular recess 58 which is established when the front or inner end surface of the rib 56 engages the adjacent end face of the thrust washer 64 of the assembly 18.

At this time, a solid column of metal of appreciable radial extent exists through the entire extent of the socket 36 so that the nut 12 attains a home position where further tightening thereof is precluded, regardless of the degree of torque or turning movement which may be applied thereto. The installation of the fitting is then complete and a sealing action which prevents escape of gas or other fluid from the interior of the fitting is effected by the O-type sealing ring 16, the latter being expanded against the outer wall of the recess 40 and the outer surface of the tube section 20. The penetration of the metal of the tube section 20 by the frusto-conical locking ring 14 as previously described, affords adequate protection against tube pull-out under conditions of tube tension far in excess of that which is encountered in actual use.

The invention is not to be limited to the exact arrangement of parts shown in the accompanying drawings or described in this specification as various changes in the details of construction may be resorted to without departing from the spirit or scope of the invention. Therefore, only insofar as the invention is particularly pointed out in the accompanying claims is the same to be limited.

Having thus described the invention what I claim as new and desire to secure by Letters Patent is:

1. A tube-to-pipe pressure fitting comprising an elongated one-piece fitting body having an axial bore and an enlarged counterbore which merges with the bore by way of an annular radial wall surface having an annular recess formed in its inner portion, a tube section having a cylindrical outer surface of uniform diameter, projecting through said counterbore and extending into said bore, said counterbore, in combination with the adjacent portion of the tube section, defining an annular socket within the fitting body, a socket-closing nut having a bore closely surrounding the tube section and provided with a cylindrical section which is threadedly received in said counterbore, said nut having an inner annular radial end face provided at its outer margin with an annular forwarding projecting rib, a resilient deformable elastomeric sealing ring encircling the tube section and seated within said annular recess, a frusto-conical metal locking ring formed of spring material, disposed within said socket immediately forwardly of said inner annular radial end face of the nut, having its outer rim region confined within said annular rib and its inner rim region closely surrounding the tube section, said locking ring having a relatively steep slant angle and a short slant height, and a thrust washer disposed within the socket, surrounding the tube section, and interposed between the locking ring and the sealing ring and presenting flat radial end faces directly opposing the inner rim region of the locking ring and the sealing ring respectively, whereby, upon tightening of the nut within the fitting body, the locking ring will be forced forwardly until the inner rim region thereof engages the adjacent end face of the thrust washer, said thrust washer will be forced forwardly until the other end face thereof engages the sealing ring and compresses the latter against the walls of said recess and against the adjacent portion of the outer surface of the tube section to establish a seal therebetween, while the frusto-conical locking ring becomes progressively flattened so that the inner rim region thereof will bite into the tube section to lock the latter against withdrawal from the fitting body, the extent of forward projection of the annular rib being at least as great as the thickness of the frusto-conical locking ring so that when the nut is fully tightened within the fitting body said rib will engage the adjacent end face of the thrust washer.

2. A tube-to-pipe pressure fitting as set forth in claim 1 and wherein the frusto-conical locking ring, in its free or normal state and before tightening of the nut, is provided with a cylindrical opening therethrough defining the small base of the locking ring, and a frusto-conical peripheral edge defining the large base of said locking ring, the slant angle of said frusto-conical peripheral edge being such that when the nut is fully tightened and the locking ring is fully flattened, the outer rim of the locking ring assumes a cylindrical configuration and fits flatly against the inner periphery of the annular rib.

3. A tube-to-pipe pressure fitting as set forth in claim 1 and wherein said thrust washer is provided with an external annular groove, and there is disposed in said groove an O-ring bearing radially outwardly against said counterbore and serving frictionally to hold the thrust washer in the counterbore of the fitting body in the event of removal of the nut from said fitting body.

References Cited

UNITED STATES PATENTS

| | | | |
|---|---|---|---|
| 1,822,056 | 9/1931 | Noble | 285—340 |
| 2,757,945 | 8/1956 | Bingham | 285—340 |
| 2,785,536 | 3/1957 | Hinckley | 285—353 |
| 3,312,484 | 4/1967 | Davenport | 285—340 |

CARL W. TOMLIN, *Primary Examiner.*

W. L. SHEDD, *Assistant Examiner.*